United States Patent
Hou et al.

(10) Patent No.: US 8,606,016 B2
(45) Date of Patent: Dec. 10, 2013

(54) EDGE DETECTION APPARATUS AND COMPUTING CIRCUIT EMPLOYED IN EDGE DETECTION APPARATUS

(75) Inventors: Li-Cong Hou, SuZhou (CN); Hong-Hai Dai, SuZhou (CN)

(73) Assignee: Realtek Semiconductor Corp., Hsinchu (TW)

( * ) Notice: Subject to any disclaimer, the term of this patent is extended or adjusted under 35 U.S.C. 154(b) by 254 days.

(21) Appl. No.: 12/888,415

(22) Filed: Sep. 23, 2010

(65) Prior Publication Data
US 2011/0069891 A1 Mar. 24, 2011

(30) Foreign Application Priority Data
Sep. 23, 2009 (TW) ................................ 98132089 A

(51) Int. Cl.
G06K 9/48 (2006.01)
G06K 9/40 (2006.01)

(52) U.S. Cl.
USPC ............................ 382/199; 382/260; 382/266

(58) Field of Classification Search
USPC ............................ 382/199, 260–261, 263, 266
See application file for complete search history.

(56) References Cited

U.S. PATENT DOCUMENTS

| | | | | |
|---|---|---|---|---|
| 5,778,156 A | * | 7/1998 | Schweid et al. | 382/176 |
| 6,075,902 A | * | 6/2000 | Kojima | 382/260 |
| 6,714,242 B1 | * | 3/2004 | Kobayashi | 382/266 |
| 7,362,894 B2 | * | 4/2008 | Ono et al. | 382/167 |
| 2002/0191857 A1 | * | 12/2002 | Macy, Jr. | 382/261 |
| 2006/0078217 A1 | * | 4/2006 | Poon et al. | 382/255 |

* cited by examiner

*Primary Examiner* — Bernard Krasnic
*Assistant Examiner* — Weiwen Yang
(74) *Attorney, Agent, or Firm* — McClure, Qualey & Rodack, LLP

(57) ABSTRACT

An edge detection apparatus includes a computing circuit and a determining circuit. The computing circuit includes a first multiplier block and a first adder unit. The first multiplier block includes n×m first multiplier units, wherein each first multiplier unit has a first multiplication factor. The n×m first multiplier units respectively perform multiplications on n×m pixels which are arranged as an n×m matrix to generate n×m first product values based on the corresponding first multiplication factors. The n×m pixels include a target pixel, where n is not equal to m. The first adder unit generates a first computation result according to the n×m first product values. The determining circuit determines if the target pixel is an edge pixel according to at least the first computation result.

16 Claims, 7 Drawing Sheets

| 1 | 2 | 1 |
|---|---|---|
| 0 | 0 | 0 |
| -1 | -2 | -1 |
| 0 | 0 | 0 |
| 0 | 0 | 0 |

N1"

| 0 | 0 | 0 |
|---|---|---|
| 0 | 0 | 0 |
| 1 | 2 | 1 |
| 0 | 0 | 0 |
| -1 | -2 | -1 |

N2"

| 1 | 2 | 1 |
|---|---|---|
| 0 | 0 | 0 |
| -1 | -2 | -1 |

N3"

| 1 | 2 | 1 |
|---|---|---|
| 0 | 0 | 0 |
| -1 | -2 | -1 |
| 0 | 0 | 0 |
| 0 | 0 | 0 |

↕ 2 pixel (between row 1 and row 3)

N1'

| 0 | 0 | 0 |
|---|---|---|
| 0 | 0 | 0 |
| 1 | 2 | 1 |
| 0 | 0 | 0 |
| -1 | -2 | -1 |

↕ 2 pixel (between row 3 and row 5)

| 1  | 2  | 1  |
|----|----|----|
| 0  | 0  | 0  |
| -1 | -2 | -1 |
| 0  | 0  | 0  |
| 0  | 0  | 0  |

N1"

| 0  | 0  | 0  |
|----|----|----|
| 0  | 0  | 0  |
| 1  | 2  | 1  |
| 0  | 0  | 0  |
| -1 | -2 | -1 |

N2"

| 1  | 2  | 1  |
|----|----|----|
| 0  | 0  | 0  |
| -1 | -2 | -1 |

EDGE DETECTION APPARATUS AND COMPUTING CIRCUIT EMPLOYED IN EDGE DETECTION APPARATUS

BACKGROUND OF THE INVENTION

1. Field of the Invention

The present invention relates to edge detection, and more specifically, to an edge detection apparatus for detecting a Bayer pattern and a computing circuit employed in the edge detection apparatus.

2. Description of the Prior Art

Bayer pattern color filter arrays are widely applied to image sensors of image-capturing devices for filtering color information of light emitted from the captured object. Please refer to FIG. 1. FIG. 1 is a color filter arrangement diagram of a Bayer pattern color filter array 10. The Bayer pattern color filter array 10 includes a plurality of patterns 12 arrayed in a matrix. Each pattern 12 includes three kinds of color filters arrayed in a 2×2 matrix. The three kinds of color filters are a red color filter, a blue color filter, and a green color filter. As shown in FIG. 1, "R" symbolizes the red color filter, "G" symbolizes the green color filter, and "B" symbolizes the blue color filter. Each pattern 12 comprises one red color filter, one blue color filter, and two green color filters based on the fact that the human visual system is more sensitive to the green color information than to the red and blue information. The two green color filters are positioned in a diagonal configuration instead of being positioned close to each other. The red color filter and the blue color filter are therefore also positioned in a diagonal configuration.

The imaging system obtains raw sensory data having less color samples per pixel because it ignores the other two color components for each pixel. Since each filter of the color filter array covers a single pixel and only allows a color in a specific spectral band to pass, before the scene image is further processed or displayed, the missing colors of each image pixel must be reconstructed so that each image pixel contains all three color components. The conventional color interpolation method uses replication of the values of the nearest neighboring image pixels, or alternatively uses linear or logarithmic averaging techniques for obtaining an average value of the neighboring image pixels for reconstructing the missing color. The color interpolation process to convert raw sensory image data into a full color image by estimating the missing color components of each image pixel from its neighboring image pixels is well known to those skilled in the art as "demosaicing". Due to the aliasing effects caused by averaging (low-pass filtering) pixel values across the edges, most demosaicing approaches often introduce image effect problems, such as zipper effects, false colors, or blurred edges of the image where there are dense edges.

In order to solve the above-mentioned problems, the conventional approach performs an edge detection upon the image, where the edge detection is utilized for determining if a pixel corresponds to the edge of the image, and for determining the edge direction and the degree of the edge variation, and then performs interpolation according to the detecting result. For a Bayer pattern, the edge detection filter needs to generate constant detecting results when the detected pixels are moved along the edge direction, therefore, many edge detection filters are not suitable for the Bayer pattern. A Sobel filter is one kind of filter utilized for Bayer pattern edge detecting, which can determine whether a pixel corresponds to a horizontal edge or a vertical edge. Generally, the Sobel filter can determine the edge directions correctly; however, the Sobel filter might determine a wrong direction in a case where noise of the detected image is significant; moreover, the Sobel filter might fail to correctly determine the edge in the slightly blurred region. In an image scaling operation, a reliable edge detection approach is required to improve the scaled image quality. Thus, there is a need for increasing the accuracy and reliability of edge detection.

SUMMARY OF THE INVENTION

It is therefore one of the objectives of the present invention to provide an edge detection apparatus and a computing circuit employed in the edge detection apparatus, to solve the above problems.

According to an embodiment of the present invention, an edge detection apparatus is disclosed. The edge detection apparatus includes a computing circuit and a determining circuit. The computing circuit includes a first multiplier block and a first adder unit. The first multiplier block includes n×m first multiplier units, wherein each first multiplier unit has a first multiplication factor. The n×m first multiplier units respectively perform multiplications on n×m pixels arranged as an n×m matrix to generate n×m first product values based on the corresponding first multiplication factors. The n×m pixels include a target pixel, where n is not equal to m. The first adder unit is coupled to the first multiplier block, for generating a first computation result according to the n×m first product values. The determining circuit determines if the target pixel is an edge pixel according to at least the first computation result.

According to an embodiment of the present invention, a computing circuit employed in an edge detection apparatus is disclosed. The computing circuit includes a first multiplier block and a first adder unit. The first multiplier block includes n×m first multiplier units, wherein each first multiplier unit has a first multiplication factor. The n×m first multiplier units respectively perform multiplications on n×m pixels arranged as an n×m matrix to generate n×m first product values based on the corresponding first multiplication factors. The n×m pixels include a target pixel, where n is not equal to m. The first adder unit is coupled to the first multiplier block, for generating a first computation result according to the n×m first product values.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating a 5×3 matrix composed of the first multiplication factors of 5×3 first multiplier units and a 5×3 matrix composed of the second multiplication factors of 5×3 second multiplier units of the edge detection apparatus shown in FIG. 4.

FIG. 7 is a diagram illustrating a 5×3 matrix composed of the first multiplication factors of 5×3 first multiplier units, a 5×3 matrix composed of the second multiplication factors of 5×3 second multiplier units and a 3×3 matrix composed of the third multiplication factors of 3×3 third multiplier units of the edge detection apparatus shown in FIG. 6.

DETAILED DESCRIPTION

Figure 2:
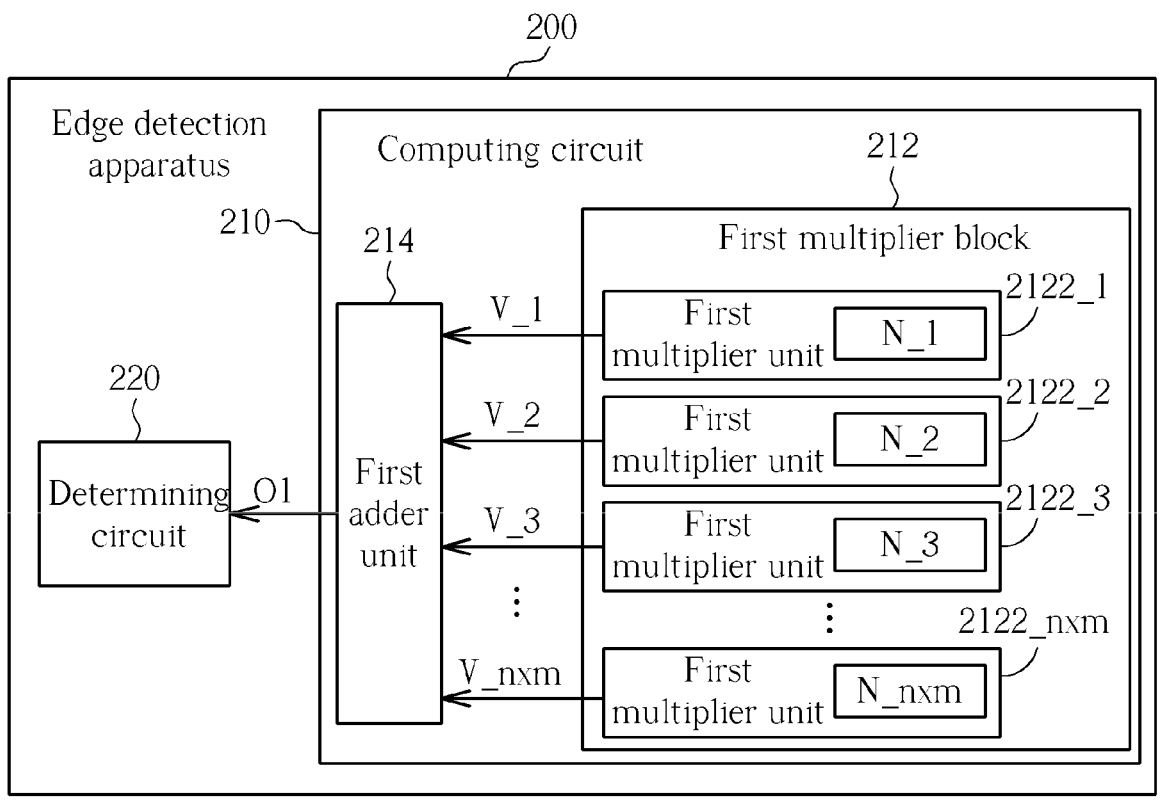
FIG. 2 is a diagram illustrating an edge detection apparatus according to a first embodiment of the present invention.

Please refer to FIG. 2. FIG. 2 is a diagram illustrating an edge detection apparatus according to a first embodiment of the present invention. The edge detection apparatus 200 includes, but is not limited to, a computing circuit 210 and a determining circuit 220, wherein the computing circuit 210 includes a first multiplier block 212 and a first adder unit 214. The first multiplier block 212 includes n×m first multiplier units 2122_1, 2122_2, 2122_3, . . . , 2122_n×m, wherein each first multiplier unit has a first multiplication factor N_1, N_2, N_3, . . . , N_n×m. The n×m first multiplier units 2122_1-2122_n×m respectively perform multiplications on n×m pixels which are arranged as an n×m matrix, thereby generating n×m first product values V_1, V_2, V_3, . . . , V_n×m based on the corresponding first multiplication factors N_1, N_2, N_3, . . . , N_n×m. The n×m pixels include a target pixel Pt (not shown in FIG. 2), where n is not equal to m. The first adder unit 214 is coupled to the first multiplier block 212, for generating a first computation result O1 according to the n×m first product values V_1, V_2, V_3, . . . , V_n×m. The determining circuit 220 is coupled to the computing circuit 210, for determining if the target pixel Pt is an edge pixel according to the first computation result O1.

Figure 1:
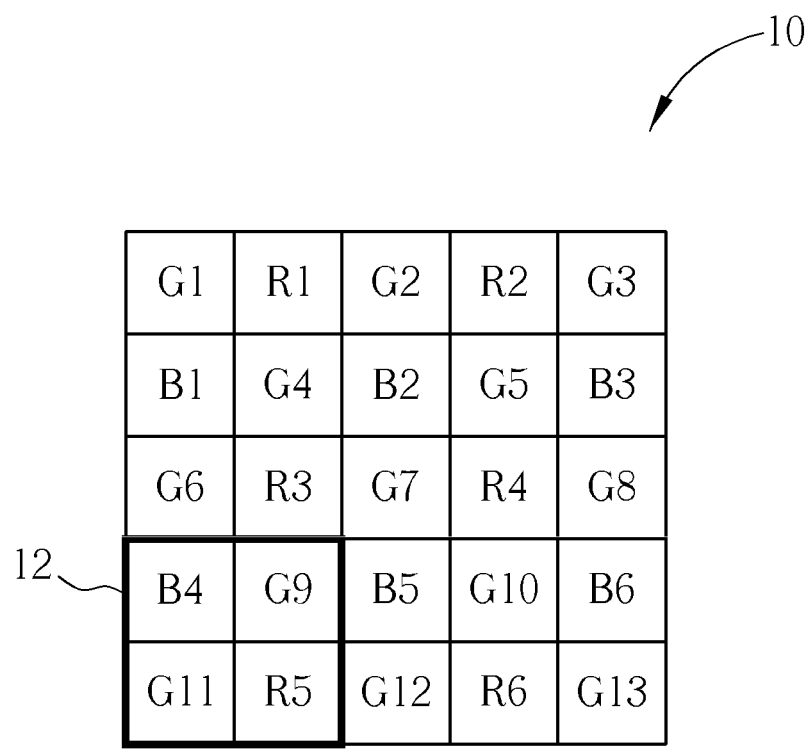
FIG. 1 is a color filter arrangement diagram of a Bayer pattern color filter array according to the prior art.
Figure 3:
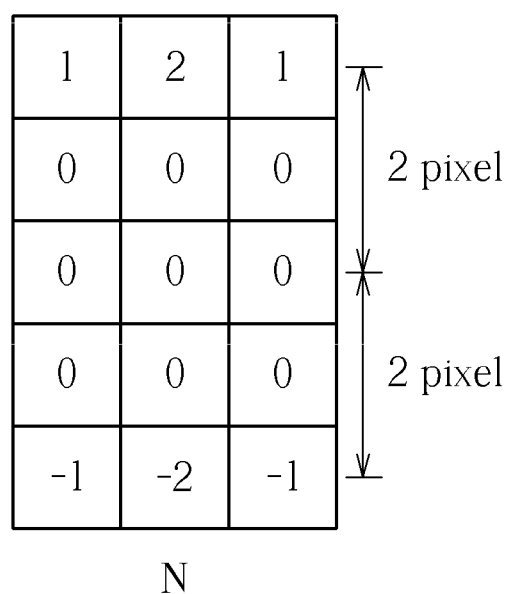
FIG. 3 is a diagram illustrating a 5×3 matrix composed of the first multiplication factors of 5×3 first multiplier units of the edge detection apparatus shown in FIG. 2.

Please note that, for clarity and simplicity, this embodiment of the present invention will be described in detail where n is equal to 5 and m is equal to 3, and with reference to the accompanying drawings. It should be noted that the present invention is not limited thereto. Please refer to FIG. 3 in conjunction with FIG. 1. FIG. 3 is a diagram illustrating a 5×3 matrix N composed of the first multiplication factors of 5×3 first multiplier units of the edge detection apparatus shown in FIG. 2. The 5×3 multiplication factor matrix N is a horizontal detecting template. For example, if the edge detection apparatus 200 takes the pixel R3 shown in FIG. 1 as the target pixel Pt to perform the horizontal edge detection, a 5×3 matrix with the pixel R3 implemented at the center position includes pixels G1, G2, G4, G6, G7, G9, G11, G12, R1, R3, R5, B1, B2, B4 and B5, and the computing circuit 210 generates the first computation result O1 according to the 5×3 matrix N shown in FIG. 3, where the first computation result O1 can be expressed as follows:

$$O1=G1*1+R1*2+G2*1+B1*0+G4*0+B2*0+G6*0+R3*0+G7*0+B4*0+G9*0+B5*0+G11*(-1)+-R5*(-2)+G12*(-1)=[(G1+2R1+G2)-(G11+2R5+G12)]$$

Then, the determining circuit 220 converts the first computation result O1 to an absolute value, for determining if the target pixel R3 is an edge pixel positioned on the horizontal direction. The horizontal detecting template can be rotated by 90 degrees to become a vertical detecting template. Because the vertical edge detecting approach is similar to the horizontal edge detecting approach, further description is omitted here for brevity. Compared to the well-known Sobel filter (which has a square filtering coefficient matrix), the edge detection apparatus 200 can detect fuzzy edges due to the detection distance of the horizontal/vertical detecting template of the present invention is much longer (i.e., the filtering coefficient matrix is an n×m matrix, and n is not equal to m).

In other words, the detection distance of the horizontal/vertical detecting template of the present invention is extended longer than conventional filters with a square filtering coefficient matrix.

Please note that, in the above-mentioned embodiment, n and m are odd numbers (e.g., n is equal to 5 and m is equal to 3), and the target pixel to be processed is implemented at the center position of the n×m matrix; however, this embodiment merely serves as an example for illustrating the present invention, and should not be taken as a limitation of the present invention. It should be appreciated by those skilled in the art that the present invention can adopt any n×m matrix composed of the multiplication factors of n×m (where n is not equal to m) multiplier units to perform horizontal/vertical detecting operations upon the n×m pixels (which include the target pixel to be processed) without departing from the spirit of the present invention.

Figure 4:
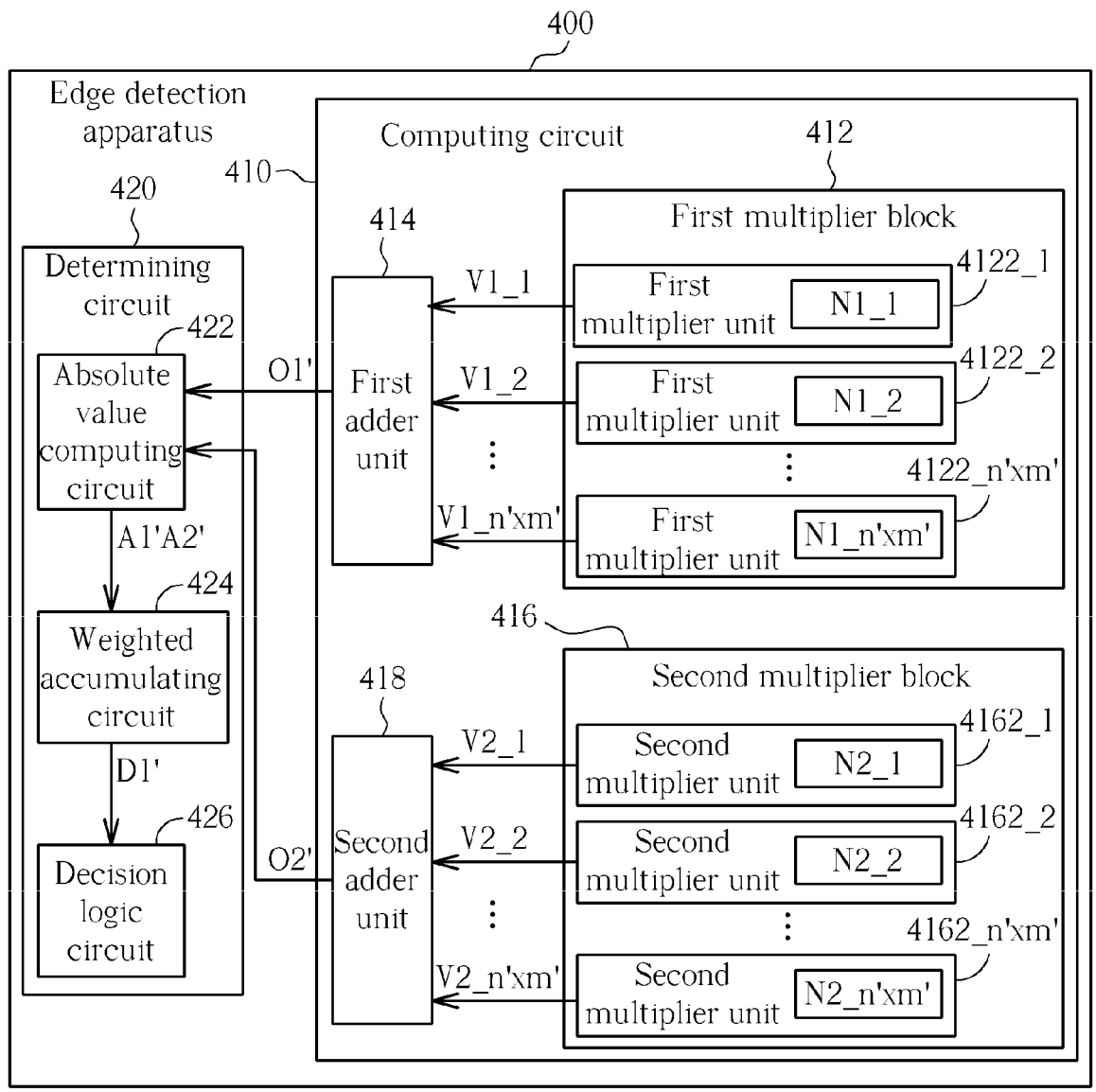
FIG. 4 is a diagram illustrating an edge detection apparatus according to a second embodiment of the present invention.

Please refer to FIG. 4. FIG. 4 is a diagram illustrating an edge detection apparatus according to a second embodiment of the present invention. In this exemplary embodiment, the edge detection apparatus 400 includes, but is not limited to, a computing circuit 410 and a determining circuit 420. The computing circuit 410 includes a first multiplier block 412, a first adder unit 414, a second multiplier block 416 and a second adder unit 418. The first multiplier block 412 includes n'×m' first multiplier units 4122_1, 4122_2, . . . , 4122_n'×m', where each first multiplier unit has a first multiplication factor N1_1, N1_2, . . . , N1_n'×m'. The n'×m' first multiplier units 4122_1-4122_n'×m' respectively perform multiplications on n'×m' pixels which are arranged as an n'×m' matrix, thereby generating n'×m' first product values V1_1, V1_2, . . . , V1_n'×m' based on the corresponding first multiplication factors N1_1, N1_2, . . . , N1_n'×m'. The n'×m' pixels include a target pixel Pt', and n' is not equal to m'. The first adder unit 414 is coupled to the first multiplier block 412, for generating a first computation result O1' according to the n'×m' first product values V1_1, V1_2, . . . , V1_n'×m'.

The second multiplier block 416 includes n'×m' second multiplier units 4162_1, 4162_2, . . . , 4162_n'×m'. Though the first multiplier block 412 and the second multiplier block 416 have the same number of multiplier units, the arrangement of the multiplication factors of the first multiplier block 412 is different from the arrangement of the multiplication factors of the second multiplier block 416. That is, the multiplication factor matrix corresponding to the first multiplier block 412 is not identical to the multiplication factor matrix corresponding to the second multiplier block 416. Each second multiplier unit has a second multiplication factor N2_1, N2_2, . . . , N2_n'×m'. The n'×m' second multiplier units 4162_-4162_n'×m' respectively perform multiplications on n'×m' pixels which are arranged as an n'×m' matrix, thereby generating n'×m' second product values V2_1, V2_2, . . . , V2_n'×m' based on the corresponding second multiplication factors N2_1, N2_2, . . . , N2_n'×m'. The second adder unit 418 is coupled to the second multiplier block 416, for generating a second computation result O2' according to the n'×m' second product values V2_1, V2_2, . . . , V2_n'×m'.

The determining circuit 420 is coupled to the computing circuit 410, for determining if the target pixel Pt' is an edge pixel according to the absolute values of the first computation result O1' and the second computation result O2'. In this exemplary embodiment, the determining circuit 420 includes an absolute value computing circuit 422, a weighted accumulating circuit 424 and a decision logic circuit 426. The absolute value computing circuit 422 is used for converting the first computation result O1' and the second computation result O2' into a first absolute value A1' and a second absolute value A2', respectively. The weighted accumulating circuit 424 is coupled to the absolute value computing circuit 422, for generating a determining value D1' according to the first absolute value A1' and the second absolute value A2', such as D1'=A1'+A2'. The decision logic circuit 426 is coupled to the weighted accumulating circuit 424, for determining if the target pixel Pt' is an edge pixel according to the determining value D1'.

Please note that this embodiment of the present invention will also be described in detail with n equal to 5, m equal to 3, and with reference to the accompanying drawings. Please refer to FIG. 5 in conjunction with FIG. 1. FIG. 5 is a diagram illustrating a 5×3 matrix N1' composed of the first multiplication factors of 5×3 first multiplier units and a 5×3 matrix N2' composed of the second multiplication factors of 5×3 second multiplier units of the edge detection apparatus 400 shown in FIG. 4. The 5×3 multiplication factor matrixes N1' and N2' are horizontal detecting templates. For example, if the edge detection apparatus 400 takes the pixel R3 shown in FIG. 1 as the target pixel Pt' to perform the horizontal edge detection, a 5×3 matrix with the pixel R3 implemented at the center position includes pixels G1, G2, G6, G7, G11, G12, R1, R3, R5, B1, B2, B4 and B5. Because the computing details are similar to that of deriving the first computation result O1, details of the computing procedure for deriving the following computation results are omitted here for brevity and only the final computation results are expressed. The computing circuit 410 generates the first computation result O1' according to the 5×3 matrix N1' shown in FIG. 5, where the first computation result O1' can be expressed as follows:

$$O1'=[(G1+2R1+G2)-(G6+2R3+G7)]$$

The computing circuit 410 generates the second computation result O2' according to the 5×3 matrix N2' shown in FIG. 5, where the second computation result O2' can be expressed as follows:

$$O2'=[(G6+2R3+G7)-(G11+2R5+G12)]$$

A1'=|O1'| and A2'=|O2'|, therefore the determining value D1' can be expressed as follows:

$$D1'=A1'+A2'=|(G1+2R1+G2)-(G6+2R3+G7)|+|(G6+2R3+G7)-(G11+2R5+G12)|$$

The determining circuit 420 then determines if the target pixel R3 is an edge pixel positioned on the horizontal direction according to the determining value D1'. Those horizontal detecting templates can be rotated by 90 degrees to become vertical detecting templates. Because the vertical edge detecting approach is similar to the horizontal edge detecting approach, further description is omitted here for brevity. This embodiment converts the two computation results generated by the detecting templates with different multiplication factors to generate the absolute values individually, and then sums the absolute values. When the edge of the image changes slowly, the computation results generated by the edge detection apparatus 400 are similar to the computation results generated by the edge detection apparatus 200. However, the edge detection apparatus 400 of the present invention can detect some minute or vein lines (i.e., lines of one-pixel or two-pixel width) precisely without making an erroneous judgment.

Please note that, in the above-mentioned embodiment, n' and m' are odd numbers (e.g., n' equal to 5 and m' equal to 3), and the target pixel to be processed is implemented at the center position of the n'×m' matrix; however, this embodiment merely serves as an example for illustrating the present invention, and should not be taken as a limitation of the present invention. It should be appreciated by those skilled in the art that the present invention can adopt any n'×m' matrix composed of the multiplication factors of n'×m' (n' is not equal to m') multiplier units to perform horizontal/vertical detecting operations upon the n'×m' pixels (which include the target pixel to be processed) without departing from the spirit of the present invention.

Figure 6:
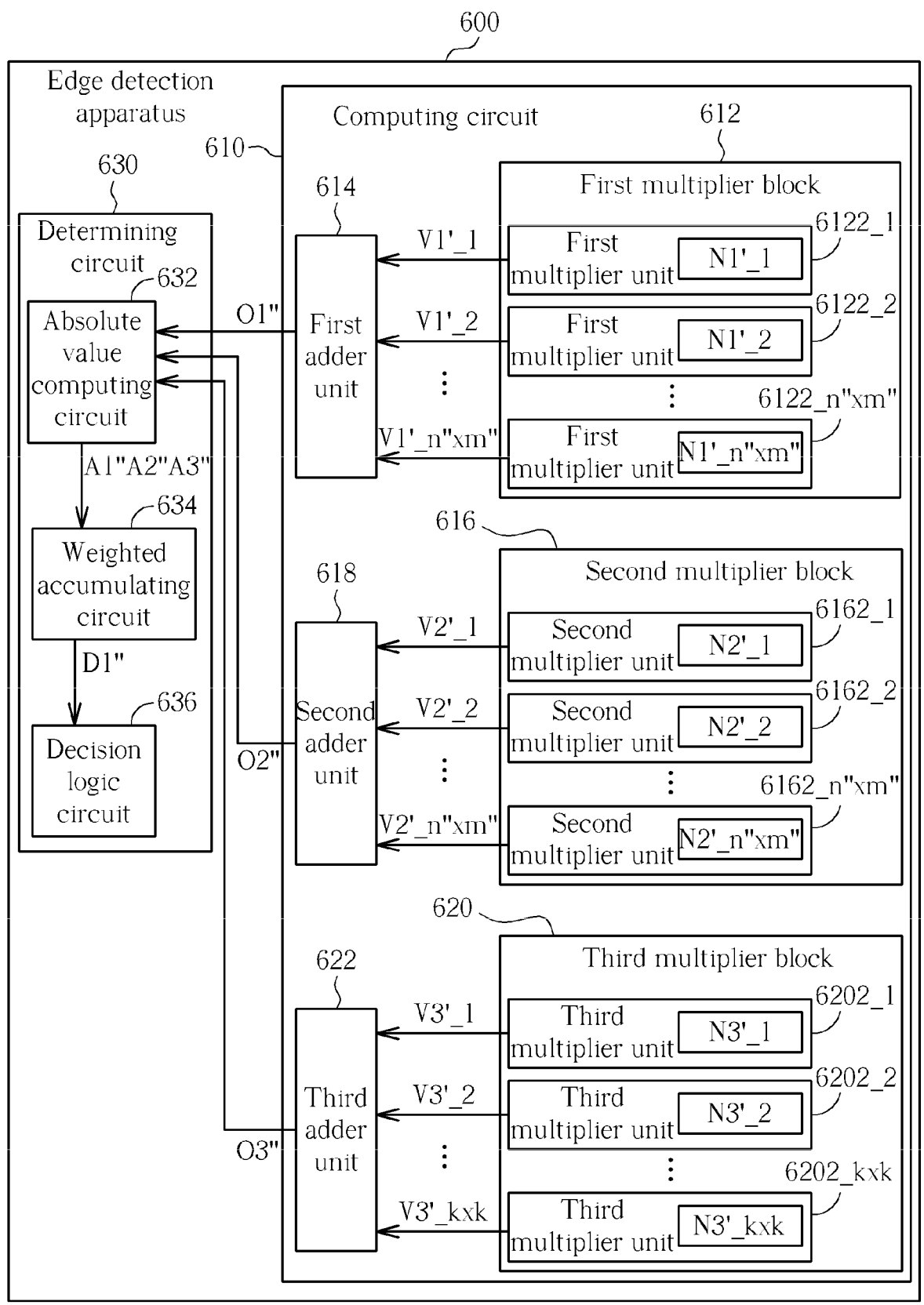
FIG. 6 is a diagram illustrating an edge detection apparatus according to a third embodiment of the present invention.

Please refer to FIG. 6. FIG. 6 is a diagram illustrating an edge detection apparatus according to a third embodiment of the present invention. In this exemplary embodiment, the edge detection apparatus 600 includes, but is not limited to, a computing circuit 610 and a determining circuit 630. The computing circuit 610 includes a first multiplier block 612, a first adder unit 614, a second multiplier block 616, a second adder unit 618, a third multiplier block 620 and a third adder unit 622. The first multiplier block 612 includes n"×m" first multiplier units 6122_1, 6122_2, ..., 6122_$n''×m''$, wherein each first multiplier unit has a first multiplication factor N1'_1, N1'_2, ..., N1'_n"×m". The n"×m" first multiplier units 6122_1-6122_$n''×m''$ respectively perform multiplications on n"×m" pixels which are arranged as an n"×m" matrix, thereby generating n"×m" first product values V1'_1, V1'_2, ..., V1'_n"×m" based on the corresponding first multiplication factors N1'_1, N1'_2, ..., N1'_n"×m". The n"×m" pixels include a target pixel Pt", and n" is not equal to m". The first adder unit 614 is coupled to the first multiplier block 612, for generating a first computation result O1" according to the n"×m" first product values V1'_1, V1'_2, ..., V1'_n"×m".

The second multiplier block 616 includes n"×m" second multiplier units 6162_1, 6162_2, ..., 6162_$n''×m''$. Though the first multiplier block 612 and the second multiplier block 616 have the same number of multiplier units, the arrangement of the multiplication factors of the first multiplier block 612 is different from the arrangement of the multiplication factors of the second multiplier block 616. That is, the multiplication factor matrix corresponding to the first multiplier block 612 is not identical to the multiplication factor matrix corresponding to the second multiplier block 616. Each second multiplier unit 6162 has a second multiplication factor N2'_1, N2'_2, ..., N2'_n"×m". The n"×m" second multiplier units 6162_1-6162_$n''×m''$ respectively perform multiplications on n"×m" pixels which are arranged as an n"×m" matrix, thereby generating n"×m" second product values V2'_1, V2'_2, ..., V2'_n"×m" based on the corresponding second multiplication factors N2'_1, N2'_2, ..., N2'_n"×m". The second adder unit 618 is coupled to the second multiplier block 616, for generating a second computation result O2" according to the n"×m" second product values V2'_1, V2'_2, ..., V2'_n"×m".

The third multiplier block 620 includes k×k third multiplier units 6202_1, 6202_2, ..., 6202_$k×k$, where k is equal to the smaller value of n and m. Each third multiplier unit has a third multiplication factor N3'_1, N3'_2, ..., N3'_k×k. The k×k third multiplier units 6202_1-6202_$k×k$ respectively perform multiplications on k×k pixels which are arranged as a k×k matrix, thereby generating k×k third product values V3'_1, V3'_2, ..., V3'_k×k based on the corresponding second multiplication factors N2'_1, N2'_2, ..., N2'_n"×m". The third adder unit 622 is coupled to the third multiplier block 620, for generating a third computation result O3" according to the k×k third product values V3'_1, V3'_2, ..., V3'_k×k.

The determining circuit 630 is coupled to the computing circuit 610, for determining if the target pixel Pt" is an edge pixel according to the absolute values of the first computation result O1", the second computation result O2" and the third computation result O3". The determining circuit 630 includes an absolute value computing circuit 632, a weighted accumulating circuit 634 and a decision logic circuit 636. The absolute value computing circuit 632 is used for converting the first computation result O1", the second computation result O2" and the third computation result O3" into a first absolute value A1", a second absolute value A2" and a third absolute value A3", respectively. The weighted accumulating circuit 634 is coupled to the absolute value computing circuit 632, for generating a determining value D1" according to the first absolute value A1", the second absolute value A2" and the third absolute value A3", such as D1"=A1"+A2"+A3". The decision logic circuit 636 is coupled to the weighted accumulating circuit 634, for determining if the target pixel Pt" is an edge pixel according to the determining value D1".

Please note that this embodiment of the present invention will also be described in detail with n equal to 5, m equal to 3, and with reference to the accompanying drawings. Please refer to FIG. 7 in conjunction with FIG. 1. FIG. 7 is a diagram illustrating a 5×3 matrix N1" composed of the first multiplication factors of 5×3 first multiplier units, a 5×3 matrix N2" composed of the second multiplication factors of 5×3 second multiplier units and a 3×3 matrix N3" (e.g., a Sobel computing matrix, which is a square matrix) composed of the third multiplication factors of 3×3 third multiplier units of the edge detection apparatus 600 shown in FIG. 6. Those multiplication factor matrixes N1", N2" and N3" are all horizontal detecting templates. For example, if the edge detection apparatus 600 takes the pixel R3 shown in FIG. 1 as the target pixel Pt" to perform the horizontal edge detection, a 5×3 matrix with the pixel R3 implemented at the center position includes pixels G1, G2, G6, G7, G11, G12, R1, R3, R5, B1, B2, B4 and B5. Because the computing details are similar to that of deriving the first computation result O1, details of the computing procedure for deriving the following computation results are omitted here for brevity and only the final computation results are expressed. The computing circuit 610 generates the first computation result O1" according to the 5×3 matrix N1" shown in FIG. 7, where the first computation result O1" can be expressed as follows:

$$O1"=[(G1+2R1+G2)-(G6+2R3+G7)]$$

The computing circuit 610 generates the second computation result O2" according to the 5×3 matrix N2" shown in FIG. 7, where the second computation result O2" can be expressed as follows:

$$O2"=[(G6+2R3+G7)-(G11+2R5+G12)]$$

The computing circuit 610 generates the third computation result O3" according to the 3×3 matrix N3" shown in FIG. 7, where the third computation result O3" can be expressed as follows:

$$O3"=[(B1+2G4+B2)-(B4+2G9+B5)]$$

A1"=|O1"|, A2"=|O2"| and A3"=|O3"|. Because the R/G/B ratio of the Bayer pattern is 1:2:1, the weighting factor ratio of A1", A2", A3" is set as 1:1:2 to match this characteristic. Therefore, the determining value D1" can be expressed as follows:

$$D1"=A1"+A2"+2A3"=|(G1+2R1+G2)-(G6+2R3+G7)|+|(G6+2R3+G7)-(G11+2R5+G12)|+2|(B1+2G4+B2)-(B4+2G9+B5)|$$

As mentioned above, the ratio of the computed R/G/B pixel number is 1:2:1, thereby fitting the pixel arrangement characteristic of the Bayer pattern; however, it is to be noted that the scope of the present invention is not limited thereto. It should be appreciated by those skilled in the art that the present invention can adopt other ratios of the weighting factors for different purposes.

Finally, the determining circuit 630 determines if the target pixel R3 is an edge pixel positioned on the horizontal direction according to the determining value D1". Those horizontal detecting templates can be rotated by 90 degrees to become vertical detecting templates. Because the vertical edge detecting approach is similar to the horizontal edge detecting approach, further description is omitted here for brevity. This embodiment converts the three computation results generated by the detecting templates with different multiplication factors to generate the absolute values individually, and then calculates a weighted sum of those absolute values; additionally, a more precise detecting result can be derived by adjusting the weighting factors.

Please note that, in the above-mentioned embodiment, n" and m" are odd numbers (e.g., n" equal to 5 and m" equal to 3), and the target pixel to be processed is implemented at the center position of the n"×m" matrix, however, this embodiment merely serves as an example for illustrating the present invention, and should not be taken as a limitation of the present invention. It should be appreciated by those skilled in the art that the present invention can adopt any n"×m" matrix composed of the multiplication factors of n"×m" (n" is not equal to m") multiplier units to perform horizontal/vertical detecting operations upon the n"×m" pixels (which include the target pixel to be processed) without departing from the spirit of the present invention.

In summary, the present invention provides an edge detection apparatus and a computing circuit employed in the edge detection apparatus. Because the computed pixels along the detecting direction are far from the target pixel, the edge detection apparatus of the present invention can detect fuzzy edges and minute or vein lines precisely without making erroneous judgments. Furthermore, the edge detection apparatus can adjust the weighting factors to thereby deriving a more precise detecting result.

Those skilled in the art will readily observe that numerous modifications and alterations of the device and method may be made while retaining the teachings of the invention.

What is claimed is:

1. An edge detection apparatus, for detecting edges of an image, comprising:
    a computing circuit, comprising:
    a first multiplier block, comprising n×m first multiplier units, wherein each of the first multiplier units has a first multiplication factor, the n×m first multiplier units respectively perform multiplications on a horizontal detecting template to generate n×m first product values based on the corresponding first multiplication factors, wherein the horizontal detecting template comprises an n×m matrix, the n×m pixels include a target pixel, and n is not equal to m; and
    a first adder unit, coupled to the first multiplier block, for generating a first computation result according to the n×m first product values;
    a determining circuit, coupled to the computing circuit, for determining if the target pixel is an edge pixel positioned in a horizontal direction according to at least the first computation result;
    a second multiplier block, comprising n×m second multiplier units, wherein each of the second multiplier unit has a second multiplication factor, the n×m second multiplier units respectively perform multiplications on n×m pixels which are arranged as an n×m matrix to generate n×m second product values based on the corresponding second multiplication factors; and a second adder unit, coupled to the second multiplier block, for generating a second computation result according to the n×m second product values;

a third multiplier block, comprising k×k third multiplier units, wherein each of the third multiplier units has a third multiplication factor, the k×k third multiplier units respectively perform multiplications on k×k pixels which are arranged as a k×k matrix to generate k×k third product values based on the corresponding third multiplication factors, wherein the third multiplier block is a Sobel filter; and a third adder unit, coupled to the third multiplier block, for generating a third computation result according to the k×k third product values; and the determining circuit determines if the target pixel is an edge pixel according to the first computation result, the second computation result, and the third computation result.

2. The edge detection apparatus of claim 1, wherein the determining circuit determines if the target pixel is an edge pixel according to absolute values of the first computation result and the second computation result.

3. The edge detection apparatus of claim 2, wherein the determining circuit comprises:
  an absolute value computing circuit, for computing the absolute values of the first computation result and the second computation result to generate a first absolute value and a second absolute value, respectively;
  a weighted accumulating circuit, coupled to the absolute value computing circuit, for generating a determining value according to the first absolute value and the second absolute value; and
  a decision logic circuit, coupled to the weighted accumulating circuit, for determining if the target pixel is an edge pixel according to the determining value.

4. The edge detection apparatus of claim 1, wherein k is equal to the smaller value out of n and m.

5. The edge detection apparatus of claim 1, wherein the determining circuit determines if the target pixel is an edge pixel according to absolute values of the first computation result, the second computation result and the third computation result.

6. The edge detection apparatus of claim 5, wherein the determining circuit comprises:
  an absolute value computing circuit, for computing the absolute values of the first computation result, the second computation result and the third computation result to generate a first absolute value, a second absolute value and a third absolute value, respectively;
  a weighted accumulating circuit, coupled to the absolute value computing circuit, for performing a weighted accumulation upon the first absolute value, the second absolute value and the third absolute value to generate a determining value; and
  a decision logic circuit, coupled to the weighted accumulating circuit, for determining if the target pixel is an edge pixel according to the determining value.

7. The edge detection apparatus of claim 1, wherein n and m are both odd numbers, and the target pixel is at a center position of the n×m matrix.

8. The edge detection apparatus of claim 7, being utilized for detecting edges of a Bayer pattern.

9. The edge detection apparatus of claim 1, wherein the computing circuit rotates the horizontal detecting template to generate a vertical detecting template for determining if the target pixel is an edge pixel positioned in a vertical direction.

10. A computing circuit employed in an edge detection apparatus, comprising:
  a first multiplier block and a second multiplier block, each comprising n×m multiplier units, wherein each of the multiplier units has a corresponding multiplication factor, wherein the multiplier units respectively perform multiplications on an n×m pixel matrix to respectively generate n×m first product values and n×m second product values based on the corresponding multiplication factors, wherein the n×m pixel matrix include a target pixel, and wherein n is not equal to m;
  a third multiplier block comprising a Sobel filter, the third multiplier block comprising k×k third multiplier units each having a third multiplication factor, wherein the k×k third multiplier units respectively perform multiplications on k×k pixels which are arranged as a k×k matrix to generate k×k third product values based on the corresponding third multiplication factor;
  a first adder unit, a second adder unit, and a third adder unit respectively coupled to the first multiplier block, the second multiplier block, and the third multiplier block for generating a first computation result, a second computation result, and a third computation result based on corresponding product values; and
  a determining circuit for determining if the target pixel is an edge pixel positioned in a horizontal direction according to at least the first computation result, and the determining circuit determines whether the target pixel is an edge pixel based on the first computation result, second computation result, and the third computation result.

11. The computing circuit of claim 10, wherein k is equal to the smaller value out of n and m.

12. The computing circuit of claim 10, wherein n and m are both odd numbers, and the target pixel is at a center position of the n×m matrix.

13. A computing circuit employed in an edge detection apparatus, comprising:
  a first multiplier block and a second multiplier block, each comprising a plurality of multiplier units, wherein each of the multiplier units has a corresponding multiplication factor, wherein the multiplier units respectively perform multiplications on an n×m pixel matrix to respectively generate first product values and second product values based on the corresponding multiplication factors, wherein the n×m pixels include a target pixel, wherein n is not equal to m;
  a third multiplier block comprising a square Sobel filter having dimensions based on a smaller of one of n and m, the third multiplier block being configured for performing multiplications on a square matrix based on multiplication factors of the Sobel filter to generate third product values;
  a first adder unit, a second adder unit, and a third adder unit respectively coupled to the first multiplier block, the second multiplier block, and the third multiplier block for generating a first computation result, a second computation result, and a third computation result based on corresponding product values; and
  a determining circuit for determining if the target pixel is an edge pixel positioned in a horizontal direction according to at least the first computation result, and the determining circuit determines whether the target pixel is an edge pixel based on the first computation result, second computation result, and the third computation result.

14. The computing circuit of claim 13, wherein the determining circuit determines whether the target pixel is an edge pixel based on a weighted combination of the first computation result, second computation result, and the third computation result.

15. The computing circuit of claim 14, wherein the weighted combination is based on a weighting factor corresponding to a pixel arrangement characteristic of a Bayer pattern.

16. The computing circuit of claim 13, wherein multiplication factor matrices corresponding to multiplication factors of the first multiplier block and the second multiplier block are not identical.

* * * * *